United States Patent [19]

Baughey

[11] Patent Number: 4,862,791
[45] Date of Patent: Sep. 5, 1989

[54] MICROWAVE FRYING SYSTEM

[76] Inventor: Nancy C. Baughey, 4237 S. Adrian Hwy., Adrian, Mich. 49221

[21] Appl. No.: 80,422

[22] Filed: Jul. 31, 1987

[51] Int. Cl.$^4$ ............................................. A47J 37/06
[52] U.S. Cl. ........................................ 99/400; 99/444; 99/450; 426/107; 426/113
[58] Field of Search ................. 99/400, 349, 385, 388, 99/389, 396, 397, 402, 444, 446, 450; 426/107, 113, 234, 243; 219/10.55 E; 229/903

[56] References Cited

U.S. PATENT DOCUMENTS

| | | | |
|---|---|---|---|
| 678,308 | 7/1901 | Tobin | 99/402 |
| 2,495,435 | 1/1950 | Welch | 426/234 |
| 3,019,721 | 2/1962 | Haapala | 99/400 |
| 3,252,407 | 5/1966 | Buerki | 99/388 |
| 3,407,723 | 10/1968 | Varkala | 99/349 |
| 3,424,596 | 1/1969 | Sullivan | 99/400 |
| 3,916,030 | 10/1975 | Bard et al. | 426/113 |
| 4,064,797 | 12/1977 | Forlani | 99/341 |
| 4,112,833 | 9/1978 | Oda et al. | 99/425 |
| 4,121,510 | 10/1978 | Frederick | 99/425 |
| 4,173,180 | 11/1979 | Reiland | 99/391 |
| 4,214,515 | 7/1980 | Kubiatowicz | 99/400 |
| 4,398,077 | 8/1983 | Freedman et al. | 426/243 |
| 4,592,914 | 6/1986 | Kuchenbecker | 219/10.55 E |
| 4,641,005 | 2/1987 | Seiferth | 219/10.55 E |
| 4,702,410 | 1/1988 | Lundquist et al. | 426/113 |

Primary Examiner—Henry J. Recla
Assistant Examiner—Linda J. Sholl
Attorney, Agent, or Firm—Beaman & Beaman

[57] ABSTRACT

A system for cooking fatty foods with microwave energy wherein the food, such as bacon, is retained between a pair of grills during cooking, and a grease-receiving receptacle is located below the grills for receiving the grease released during heating. The grills are hinged together and include handles for facilitating grill separation for inserting and removing the food therebetween. The grills and receptacle are formed of materials transparent to microwave energy. The invention also contemplates a package for fatty foods wherein the food is held between grills and a receptacle located below the grills permits the packaged food, when encased in an envelope, such as film, to be cooked with microwave energy within the package.

6 Claims, 1 Drawing Sheet

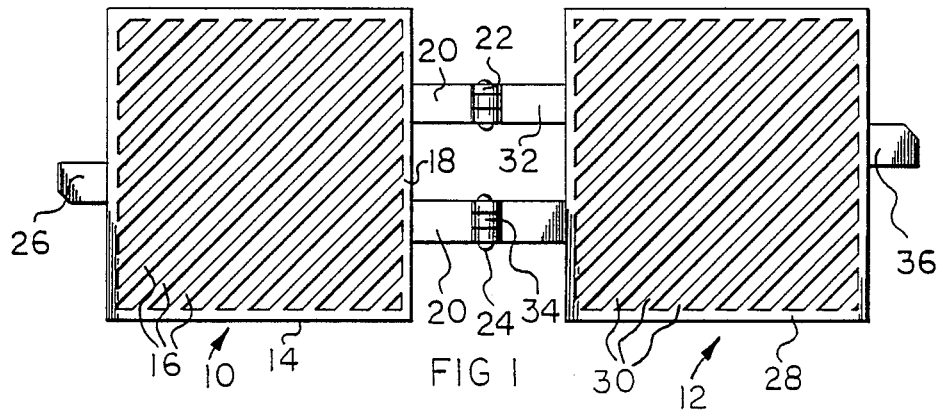
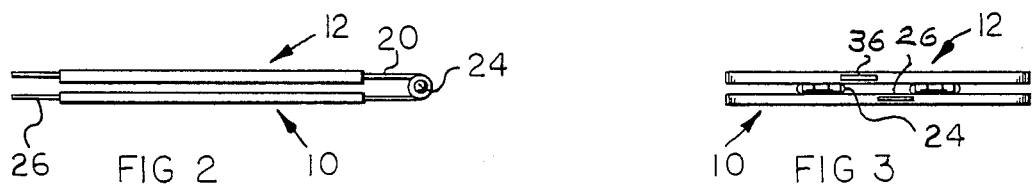
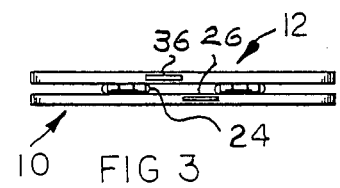
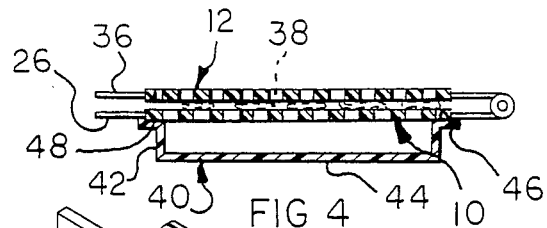
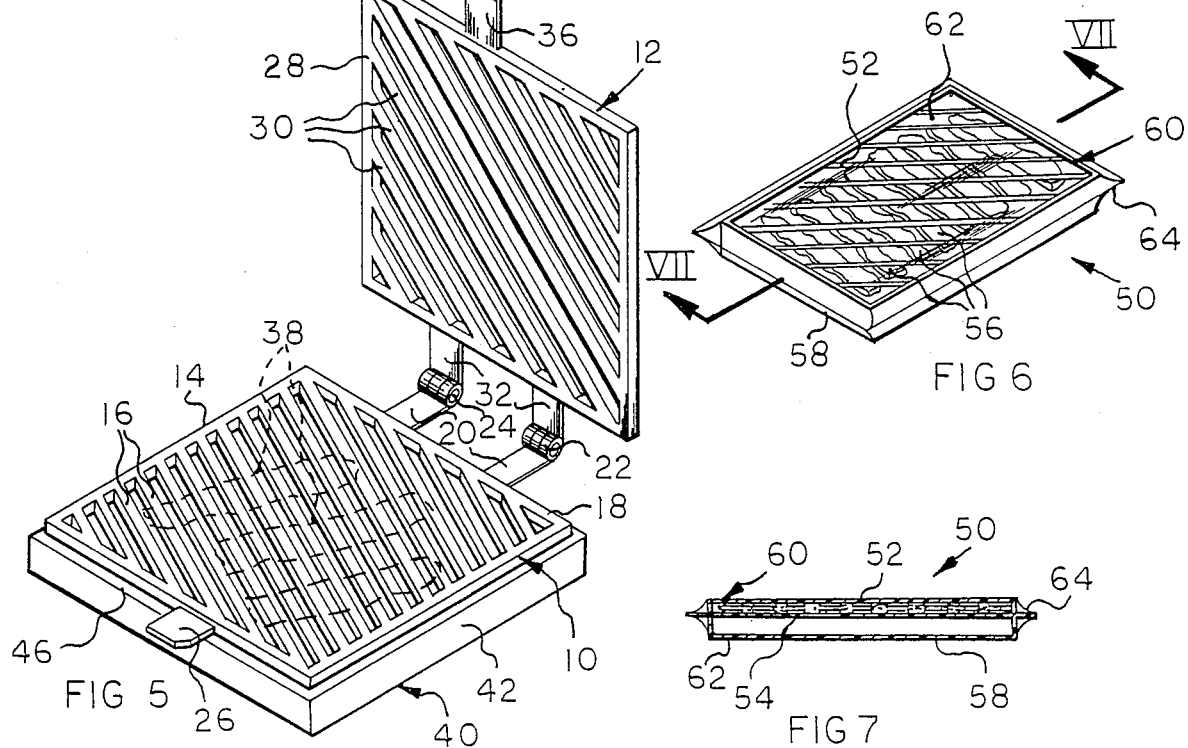
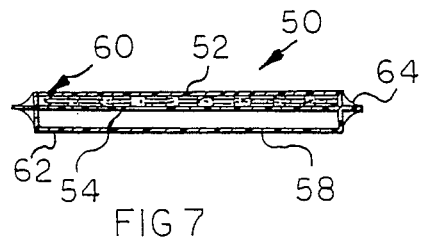
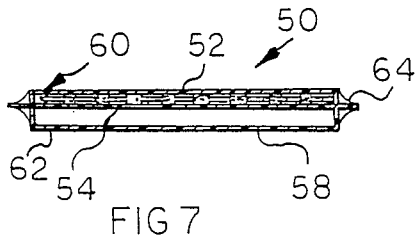

MICROWAVE FRYING SYSTEM

BACKGROUND OF THE INVENTION

Foods containing fat and greases release the grease in a liquid form during cooking, and a number of devices have been proposed for facilitating the cooking of such foods, such as bacon strips, such apparatus being typified by that shown in U.S. Pat. Nos. 3,019,721; 3,407,723; 4,064,797; 4,112,833; 4,121,510 and 4,214,515.

Cooking apparatus such as shown in the above identified patents often includes grills and supports for positioning and retaining the food during cooking, and such retainers aid in controlling meat shrinkage and shaping during cooking. As the grease is released such known devices utilize means for trapping or catching the falling grease. While many of the devices shown in the aforementioned patents are intended for conventional convection cooking, it is known to use microwave energy with such devices as typified in U.S. Pat. Nos. 4,112,833 and 4,121,510.

Known cooking apparatus of the aforementioned type is relatively complicated in nature, expensive to manufacture, bulky, inconvenient to use, and difficult to clean. Accordingly, such devices have not experienced widespread acceptance.

While cooking with microwave energy has a number of advantages such as reduced cooking time, uniformity of heating, and the like, difficulty is encountered in the microwave heating of bacon, for instance, due to the release of the grease during heating and it is common to surround microwaved bacon with absorbant material, such as paper, to remove the grease from the food as it heats.

Heretofore, apparatus particularly suitable for cooking bacon with microwave energy has not received widespread acceptance, and it is an object of the invention to provide a microwave cooking system utilizing apparatus transparent to microwave energy which is of an economical nature to manufacture, easy to use by inexperienced users, easy to clean and which removes the grease from proximity with the food during cooking.

Another object of the invention is to provide a system for the microwave cooking of food releasing grease during heating wherein the grease removed in the form of a liquid is effectively caught and retained remote from the cooked food.

A further object of the invention is to provide a microwave cooking system for fatty foods wherein a pair of relatively movable grills are employed to confine and retain the food during cooking, and wherein a receptacle located below the grills receives released grease and fats.

An additional object of the invention is to provide a packaging system for the packaging and handling of fatty foods wherein the foods may be cooked directly in the package and the foods are supported and retained in an acceptable manner for cooking and the package includes a receptacle for receiving the released grease.

In the practice of the invention the food to be cooked, such as bacon strips, is located between a pair of grills defined by a frame having parallel food-supporting elements mounted thereon. The elements in the grills are angularly related to each other wherein the food will be adequately supported therebetween, and the bacon strips are laid transversely to the length of the elements.

The grills are preferably pivoted with respect to each other by hinge structure associated with a side of each frame, and handles are located upon the other frame side to facilitate opening and closing of the grills so that food may be placed therebetween and removed therefrom.

A receptacle in the form of a shallow pan having an open top is located directly below the lower grill, and may interconnect or intermesh with the lower grill, or could be homogeneously defined therewith. The receptacle receives the liquid grease released by the food during cooking which falls through the lower grill.

The material of the grills and receptacle is transparent to microwave energy, and may be formed of a synthetic plastic, glass, paper or the like.

It is within the scope of the invention that the apparatus be formed of a disposable material, such as paper, wherein one time use is economically feasible, and cleaning of the apparatus is not required.

The concepts of the invention may also be used with a package designed for packaging foods releasing grease and fats during cooking. In such instance the package will consist of a pair of grills having the food to be cooked located therebetween, and an open receptacle is defined below the lower grill. The entire apparatus, including grills and receptacle, are encased within an envelope, preferably formed of a synthetic plastic film, which may be shrunk, shaped, extruded, or otherwise formed to closely confine the grill, food and receptacle, and, of course, the grills, receptacle and the material of the envelope must be transparent to microwave energy.

Upon placing the package within the microwave oven, and piercing a few venting holes therein, the packaged food may be directly cooked within its envelope wherein the grease will fall into the receptacle, and the food completely cooked prior to being removed from its package.

BRIEF DESCRIPTION OF THE DRAWINGS

The aforementioned objects and advantages of the invention will be appreciated from the following description and accompanying drawings wherein:

FIG. 1 is a plan view of the food retaining grills in accord with the invention, the grills being shown in an open planar relationship, FIG. 2 is a side, elevational view of the grills as shown folded in the closed position, FIG. 3 is an elevational view as taken from the left of FIG. 2, FIG. 4 is an elevational sectional view of the grills and assembled receptacle as shown in the operable relationship, FIG. 5 is a perspective view of cooking apparatus in accord with the invention illustrating the grills in an open position and the receptacle located below the grills, FIG. 6 is a perspective view of a food package incorporating the inventive concepts, and FIG. 7 is an elevational sectional view as taken along Section VII—VII of FIG. 6.

DESCRIPTION OF THE PREFERRED EMBODIMENTS

With reference to FIGS. 1-5, the frying system in accord with the concepts of the invention utilizes grill members for retaining and locating the food during cooking. The apparatus includes a lower grill 10 and an upper grill 12. The lower grill includes a rectangular frame 14 having a plurality of parallel linear elements 16 extending across the frame, and as will be appreciated from the drawings, the elements 16 are obliquely related to the frame configuration.

The frame rear edge 18 includes hinge extensions 20 projecting therefrom supporting hinges 22 which include hinge pins 24. At the opposite frame edge a handle 26 extends therefrom and is sufficiently rigid to permit handling of the grill frame thereby.

The upper grill 12 is identical to grill 10 including a frame 28 and parallel elements 30, hinge extensions 32, hinge 34 and handle 36. The elements 30 are angularly related to the frame 28 such that upon hinging of the grills to the closed position shown in FIG. 2, the elements 16 will be angularly related to the elements 30 so as to form a diamond pattern and confine food therebetween and maintain be shape and flat configuration of the food, such as bacon strips, generally along the length and width of the food during cooking.

As appreciated from FIGS. 2 and 3, the hinge pins 24 permit the grills 10 and 12 to be pivoted to a superimposed position for confining the food 38, bacon strips being illustrated therebetween and during cooking the grills will be in the closed position of FIGS. 2-4.

A receptacle 40 is located below the lower grill 10, FIG. 4, and the receptacle is of a dish configuration having upstanding sides 42 and a base 44 wherein the upper portion of the receptacle is open in its entirety to the area of the grill frame 14. The receptacle 40 includes a flange 46 defining a recess 48 having locating shoulders for receiving the grill 10 and maintaining the grill in predetermined relationship to the receptacle. Such locating means may take any conventional form, and it is also within the concept of the invention that the receptacle 40 be homogeneously formed of the same material as the grill 10 wherein the frame 14 is defined by the upper periphery of the receptacle sides. However, it is preferable that the grill 10 and receptacle 40 be separable for cleaning purposes.

As will be appreciated from FIG. 5 the handles 26 and 36 permit the grills 10 and 12 to be pivoted to the open position of FIG. 5 permitting the bacon strips 38 to be located upon the elements 16 of grill 10. Thereupon the grill 12 is pivoted to be closed position of FIGS. 2-4, and the grills and receptacle placed within a microwave oven to subject the food to microwave energy. As the grills 10 and 12, and their associated components, and receptacle 40, are formed of material transparent to the microwave energy, such as plastic, glass, paper and the like, only the food 38 will be heated by the microwave energy and as the food is cooked the fat therein will liquify and drip into the receptacle 40. The tendency for the food to shrivel and curl is resisted due to the confinement between the grill elements 16 and 30, and upon cooking being completed the entire apparatus is removed from the microwave oven, the upper grill 12 pivoted to the open position, and the food 38 removed.

Cleaning of the grills and receptacle are easily accomplished by conventional means, including automatic dishwashing, and the simple nature of the apparatus of the invention permits ease of manufacture, assembly and shipping, and upon forming the grills and receptacles of a disposable material, such as plastic or paper, the apparatus may be disposed of after a single use, eliminating the need for cleaning.

The concepts of the invention may also be utilized in a food package wherein the food may be cooked within the package as purchased. In this form of the invention the package 50 consists of upper and lower grills 52 and 54, respectively, FIGS. 6 and 7, and the food 56, such as bacon strips, is located between the grills. The lower portion of the package 50 consists of the receptacle 58 located below the lower grill 54 and of a shallow depth sufficient to receive the liquid fat released during cooking.

The grills 52 and 54 and receptacle 58 are encased within an envelope 60 preferably formed of a synthetic plastic film 62 capable of withstanding the heat to which the film will be subjected during microwave energy cooking of the package ingredients. The film 62 will be stretched over the grill 52 and under the receptacle 58 and may be of the heat-shrink type, and may include a peripheral seam 64 sealed by heating. The particular type of envelope is not critical as long as it meets the heat resistance and sanitation requirements for packaging, and preferably, the envelope is transparent so that the food located therein is readily visible and identifiable.

Of course, with the package 50 of FIGS. 6 and 7, the grills, receptacle and envelope 62 are formed of materials which are transparent to microwave energy. The grills and receptacle may be formed of paper and the entire package 50 is disposed of after use.

By placing the package 50 within a microwave oven, not shown, and after vent piercing the package in a few places to release gases generated during cooking, the food 56 may be directly cooked within the package and the grease and fat will drip into the receptacle 58. After cooking is completed, the envelope film 62 is removed, the upper grill 52 opened or removed, and the food 56 removed from the lower grill. The convenience of such packaging will be readily appreciated.

The handles 26 and 36 permit the grills 10 and 12 to be turned over with the food therebetween, and if it is desired to turn be food over during cooking the handles readily accomplish this operation.

It will be appreciated that various modifications to the inventive concepts may be apparent to those skilled in the art without departing from the spirit and scope of the invention. For instance, the hinge structure connecting the grills could be entirely of plastic comprising bendable straps and both grills and hinge could be a single homogeneous part easily injection molded.

I claim:

1. A system for cooking food in a microwave oven wherein the food tends to deform and curl and releases grease during cooking comprising, in combination, a substantially planar upper microwave pervious grill, a substantially planar lower microwave pervious grill, each of said grills including a peripheral frame having a rear edge and a front edge, hinge means being located adjacent said frames' rear edges interconnecting said upper and lower grills permitting said upper grill to be pivoted relative to said lower grill between open and closed positions, said grills each including a plurality of parallel linear elements, said elements of said upper grill being oliquely angularly related to said elements of said lower grill when said upper grill is superimposed over said lower grill in said closed position to form a diamond pattern, food being directly retainable between said grills and supported by said grills generally throughout its length and width, and a grease receiving and retaining receptacle located below said lower grill for receiving grease released from the food during cooking, said receptacle being formed of a material substantially transparent to microwave energy.

2. In a system for cooking food as in claim 1, said grills and receptacle being formed of a paper material.

3. A disposable package for food wherein food tending to deform and curl and releases grease during cooking may be cooked directly within the package by microwave energy comprising, in combination, upper and lower substantially planar grills, said upper grill being superimposed upon said lower grill, food interposed between and supported by said grills, said grills each including a plurality of parallel linear elements, said elements of said upper grill being obliquely angularly related to said elements of said lower grill whereby food supported between said grills is generally supported throughout its length and width, a receptacle located below said lower grill and in communication therewith for receiving grease from said food during cooking, and an envelope enclosing said grills, food and receptacle, said envelope, grills and receptacle being formed of a material substantially transparent to microwave energy.

4. In a package as in claim 3 said grills and receptacle being formed of a paper material.

5. In a package as in claim 3, said envelope being formed of a synthetic plastic film.

6. In a package as in claim 5, said envelope being transparent.

* * * * *